United States Patent
Kashani et al.

(10) Patent No.: US 12,547,750 B2
(45) Date of Patent: Feb. 10, 2026

(54) SYSTEM AND METHOD FOR REMOTE ATTESTATION OF VEHICLE FEATURES

(71) Applicant: DENSO CORPORATION, Kariya (JP)

(72) Inventors: Ameer Kashani, Southfield, MI (US); Carlos Mora-Golding, Southfield, MI (US); Tomonori Ikuse, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 18/402,463

(22) Filed: Jan. 2, 2024

(65) Prior Publication Data

US 2025/0217505 A1  Jul. 3, 2025

(51) Int. Cl.
*G06F 21/62* (2013.01)
*G06F 8/65* (2018.01)
*G07C 5/00* (2006.01)

(52) U.S. Cl.
CPC ............ *G06F 21/6218* (2013.01); *G06F 8/65* (2013.01); *G07C 5/008* (2013.01)

(58) Field of Classification Search
CPC ........ G06F 21/6218; G06F 8/65; G07C 5/008
See application file for complete search history.

(56) References Cited

U.S. PATENT DOCUMENTS 11,841,970 B1 * 12/2023 Fan ..................... G06F 21/31
2021/0362735 A1 * 11/2021 Nagao ................. H04L 9/3247

OTHER PUBLICATIONS

"A Framework for Self-Verification of Firmware Updates over the Air in Vehicle ECUs," Nilsson et al., IEEE, dated Nov. 30, 2008.
SECPAT: Security Patterns for Resilient Automotive E/E Architectures, Plappart, et al., IEEE, Mar. 9, 2022.
"Protection for Automotive Electronic Control Units using Authenticity Heartbeat Signals," Wasicek, IEEE, dated Jul. 20, 2012.
"Decentralized Firmware Attestation for In-Vehicle Networks," Rawat et al., ACM Transactions on Cyber-Physical Systems, dated Jul. 2, 2019.
"Don't Brick Your Car: Firmware Confidentiality and Rollback for Vehicles," Mansor et al., IEEE, dated Aug. 24, 2015.
"Recognizing Manipulated Electronic Control Units," Wasicek et al., SAE International, Apr. 14, 2015.

* cited by examiner

*Primary Examiner* — Mohamed A. Wasel
(74) *Attorney, Agent, or Firm* — Harness, Dickey & Pierce, P.L.C.

(57) ABSTRACT

Methods for attestation of a vehicle feature associated with a vehicle control unit are provided and include: detecting, using a trusted application, whether a configurable feature has been activated based on one or more detection models; periodically detecting during runtime, using each of the one or more detection models, whether the configurable feature is activated; generating a report of attestation results indicating that the configurable feature is one of: activated and unauthorized; activated and authorized; un-activated and authorized; and un-activated and unauthorized; determining whether an activated feature is unauthorized, wherein the activated feature is the configurable feature that has been detected as being activated; and activating a response mechanism and restoring the configurable feature of the vehicle to an inactive state in response to the activated feature being unauthorized.

15 Claims, 8 Drawing Sheets

SYSTEM AND METHOD FOR REMOTE ATTESTATION OF VEHICLE FEATURES

FIELD

The present disclosure relates to systems and methods for remote attestation of a vehicle.

BACKGROUND

This section provides background information related to the present disclosure which is not necessarily prior art.

Once a vehicle is purchased, the owner of the vehicle may desire to enhance a vehicle's performance by activating one or more inactive features provided by a vehicle manufacturer and/or an original equipment manufacturer (OEM). However, while the vehicle purchaser may own the vehicle, the parts and the components are in the control of the OEM or the vehicle manufacturer that manufactured those parts and components. This control exists because the intellectual property such as the software and/or firmware associated with the parts and/or components are owned by the OEM and/or vehicle manufacturer. Therefore, any replacement and/or modification of those parts and/or components including software/firmware updates may need the approval and activation by the OEM. Thus, the vehicle manufacturer or the OEM may provide services associated with future repairs and/or upgrades to one or more features of the vehicle.

In some cases, the OEM may not have a trusted computing framework or strategy inside of the vehicle to safely implement a software/firmware update and prevent malicious users from also accessing to their parts/components to modify their protected software/firmware applications.

The present disclosure addresses the above-mentioned and related concerns.

SUMMARY

This section provides a general summary of the disclosure, and is not a comprehensive disclosure of its full scope or all of its features.

In one aspect of the present disclosure, a method for attestation of a vehicle feature associated with a vehicle control unit is provided. The method includes detecting, using a trusted application stored in a trusted execution environment of a vehicle, whether a configurable feature has been activated based on one or more detection models. The configurable feature includes a specific vehicle functionality and includes an active state or an inactive state such that the vehicle operates the specific vehicle functionality when the configurable feature is activated in the active state The method includes determining whether an activated feature is unauthorized. The activated feature is the configurable feature that has detected as being activated. The method includes activating a response mechanism in response to the activated feature being unauthorized.

In one or more forms, the detecting whether the configurable feature has been activated further comprises periodically detecting whether the configurable feature is activated based on a predetermined time interval during runtime.

In one form, the detecting whether the configurable feature has been activated further comprises determining whether configuration change data has been modified to activate the configurable feature by at least one of adding, deleting, modifying or a combination thereof software/firmware related to the configurable feature.

In another form, the determining whether the configurable feature has been activated further comprises intercepting data associated with one or more hardware peripherals electrically coupled to the trusted execution environment to determine whether the configurable feature has been activated.

In yet another form, the activating the response mechanism further comprises generating a report of attestation results in response to the configurable feature being at least one of activated and unauthorized, activated and authorized, un-activated and authorized, and un-activated and unauthorized.

In one form, the activating the response mechanism further comprises restoring the configurable feature of the vehicle to an inactive state.

In still another form, the determining whether the activated feature is authorized includes determining whether a secure flag has been set to indicate that the configurable feature is authorized by an original equipment manufacturer.

In yet another form, the method further includes downloading firmware, configuration, software, or a combination thereof to an electronic control unit of a vehicle to active the configurable feature of the vehicle; generating configuration change data based on the downloaded firmware, configuration, software, or a combination thereof; and setting a secure flag to indicate that the firmware, configuration, software, or a combination thereof is authorized by an original equipment manufacturer.

In one form, the one or more detection models include a qualifying event configured to determine when to determine whether the configurable feature has been activated. The qualifying event is configured to trigger based on one of a predetermined time interval based on a configurable build time parameter, a dynamic event performed within the vehicle, a request initiated by an original equipment manufacturer (OEM) or a combination thereof.

In another form, the detecting whether the configurable feature has been activated based on the one or more detection models further comprises detecting a presence of a manufacturing feature bypass application or feature.

In one aspect of the present disclosure, a method for generating a trusted application to determine whether a feature has been activated in a vehicle is provided. The method includes receiving a vehicle feature profile to activate a vehicle feature; generating configuration change data as the vehicle feature is being activated. The configuration change data is a report that includes one or more fields and field values associated with the one or more fields. Each of the one or more fields and the field values indicates at least one of one or more additions of software programming applications, deletions of software programming applications, one or more modifications of software programming applications or a combination thereof. In one form, the software programming applications includes computer program instruction code, calibration values, configuration values, system settings and the like. The method includes generating a trusted application and one or more test cases based on the configuration change data, wherein the trusted application is configured to determine whether the feature has been activated, and wherein the one or more test cases are configured to determine whether the trusted application operates to detect whether the feature is detected.

In one form, the method further includes executing the trusted application using the one or more test cases to determine whether the vehicle feature has been activated; determining whether one or more errors have occurred while executing the trusted application; and generating a report indicating whether the one or more errors have occurred.

In yet another form, the method includes generating a negative report and another trusted application when the one or more errors have occurred.

In still another form, the method includes executing the trusted application using the one or more test cases to determine whether the vehicle feature has been activated; determining whether one or more errors have occurred while executing the trusted application; and generating another trusted application when the one or more error have occurred.

In one form, the method includes receiving a download of a feature activation profile to activate a vehicle feature in a vehicle; activating the vehicle feature in the vehicle; generating a second configuration change data when the vehicle feature is activated; and determining whether the vehicle feature has been activated using the trusted application.

In another form, the trusted application being generated further includes generating the trusted application using one or more code templates of common source code patterns to detect one or more fields of the configuration change data.

In still another form, the one or more test cases being generated includes generating the trusted application using one or more code templates of common source code patterns to detect one or more fields of the configuration change data.

In yet another form, the trusted application being generated includes generating the trusted application using a language model to detect one or more fields in the configuration change data and predict software code for the trusted application based on the one or more fields.

In one form, the one or more test cases being generated includes generating the one or more test cases using a language model to detect one or more fields in the configuration change data and predict software code for the one or more test cases based on the one or more fields.

Further areas of applicability will become apparent from the description provided herein. The description and specifications in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure provides systems and methods for remote attestation implemented in a vehicle. In one form, a remote attestation method and system is defined to include an in-vehicle software attestation, a trust mechanism, which allows a verifier to independently validate the integrity of an activated feature of the vehicle. This method and system provide OEMs and vehicle owners the confidence to trust that the changes in the firmware and/or software of a vehicle are from a trusted source. In addition, the method and system provide a verification that the vehicle has not been compromised by malicious code.

In one form, the method and system provide an attestation module configured to detect unauthorized vehicle features. In another aspect of the present disclosure, the system and method can detect modifications to the vehicle's system that indicate unauthorized use of a feature through a build-time learning process. In a still another form, a trusted environment of the vehicle electronic control unit is configured to display judgement of authorization without posing safety risks.

Still in another form, a system and method for generating an attestation module is provided. In one form, the system and method include an automatic method of generating configuration change data.

Figure 1:
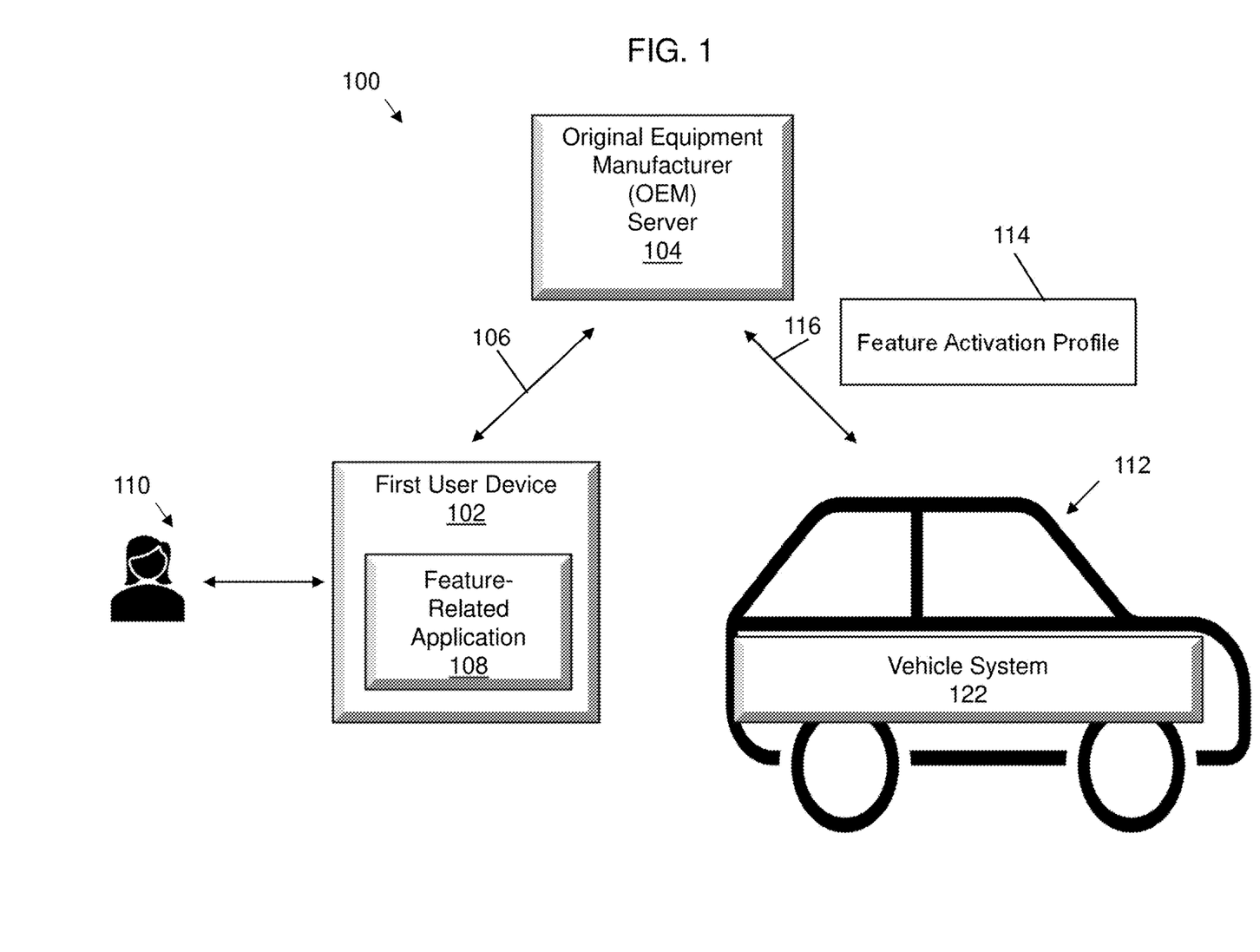
FIG. 1 is an illustration of a feature activation system for a vehicle according to the present disclosure.

Referring to FIG. 1, FIG. 1 depicts an overview of an example system 100 to activate a feature of a vehicle. The system 100 includes a first user device 102 configured to transmit a request for a feature of a vehicle 112 to be enabled by an original equipment manufacturer (OEM) server 104, via a first communication link 106. The OEM server 104, in response, pushes a feature activation profile 114 to the vehicle 112, via a second communication link 116. The vehicle 112 is configured to install the feature activation profile 114 to activate the associated feature. The vehicle 112 is also configured to determine whether the feature has been activated and/or authorized by the OEM server 104 and respond accordingly. Each of the first user device 102, the OEM server 104, and the vehicle 112 along with the communication links 106, 116 will be further discussed below.

In one form, the first user device 102 may include a smartphone, a tablet, a laptop, or other computing device. The first user device includes a feature-related application 108 running on the first user device 102 to request activation of a feature in a vehicle, via the OEM server 104. The feature-related application 108 may require a first user 110, such as an owner or an operator of the vehicle 112, to register with the OEM server 104 prior to requesting a feature to be enabled by the OEM server 104. Along with user registration, the feature-related application 108 may also require the user to comply with other requirements and/or conditions in exchange for enabling the feature in the vehicle 112. In one form, the other requirements and/or conditions could include applicant-related registration information. In another example, the other requirements and/or conditions may require the first user 110, using the feature-related application 108, to provide a payment of a predetermined amount in exchange for activation of the specific feature at or after the sale of the vehicle 112. In another example, other requirements and/or conditions may include the user providing an email address or other personal information in exchange for the activation of the activation of the specific feature. After a selection is made for a specific feature and, if applicable, the other requirements and/or conditions are fulfilled, the feature-related application may transmit to the OEM server 104 the request for an activation of a feature in the vehicle 112, via the first communication link 106. The OEM server 104 shall be further discussed below.

In one form, the first communication link 106 between the first user device 102 and the OEM server 104 includes a wireless communication link. The first communication link 106 may include Bluetooth network link, a WiFi network link, a cellular data network link such as a LTE, 3G, 4G, or 5G network link, a satellite link, or any suitable communication link.

In one form, the feature is one of a plurality of features of the vehicle 112. In this application, each feature may be defined as a specific vehicle functionality or attribute that is added, modified, and/or deleted based on firmware and/or software downloaded to the vehicle 112. A feature, for example, may include, but is not limited to, at least one of the following: drivetrain performance control, race track or off-road control, trailer hitch control, ambient lighting control, accessory lighting control, customizable user interface or system themes, smart phone interfaces, premium audio systems, premium climate control systems, 360-degree view camera systems, electrochromic glazing control, auto dimming mirrors, fast charging, keyless entry, multizone climate systems, heads up display, heated seats, heated steering wheel, memory seats, remote start/ignition, remote camera video streaming, remote event notification, vehicle-to-grid (V2G) mode, WiFi hotspot mode, security alarm and video recording (i.e., CCTV) systems, premium navigation/routing systems, gaming applications, media streaming services, autonomous features such as automated valet parking, automated servicing, premium and lane keeping assist, massaged seats and so on. Each feature includes an active state or an inactive state. When a feature is enabled, the feature is in the active state and the vehicle operates the specific functionality of the feature.

The OEM server 104 is configured to receive the request for activation of a feature of the vehicle 112 along with other information/data, if applicable, to comply with any other requirements and/or conditions in exchange for enabling the feature in the vehicle 112. In one form, the OEM server 104 is configured to push a feature activation profile 114 to the vehicle 112, via a second communication link 116. The second communication link 116 includes similar features and functions as the first communication link 106, and thus will not be repeated for the sake of brevity.

Figure 2:
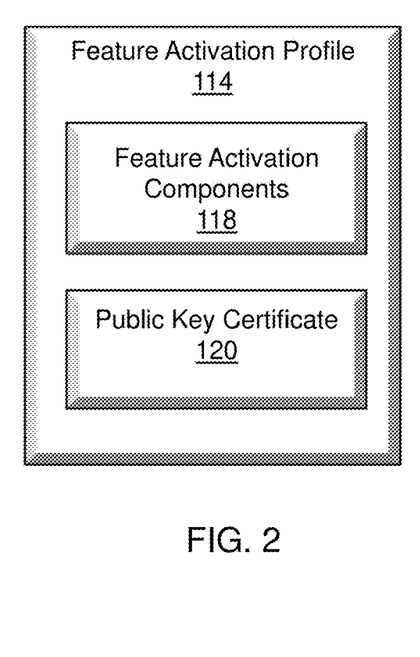
FIG. 2 is a block diagram of a feature activation profile according to the present disclosure.

As shown in FIG. 2, the feature activation profile 114 includes feature activation components 118. The feature activation components 118 include one or more software components and/or parameters for updating/changing an inactive feature into an active feature of the vehicle 112. In one form, the feature activation profile 114 also includes a public key certificate 120. The public key certificate 120 is a digital certificate configured to provide a type of authentication indicating that an identification and other attributes of the OEM server 104, as vouched for by a certification issued by a certification authority, can be trusted as a reliable source. As a result, an OEM ensures that the OEM server 104 is the entity it is identified to be. The public key certificate 120 may be obtained directly or indirectly from a certification authority, such as the OEM of the vehicle 112.

Referring again to FIGS. 1 and 3, firmware, configuration, software, or a combination thereof the vehicle 112 includes a vehicle system 122 and is configured to receive the feature activation profile 114. In one form, the vehicle system 122 includes hardware peripheral devices 124, one or more sensors 126, an electronic control module (ECMs) 128 and other vehicle devices 130 configured to operate one or more vehicle features and/or functions as shown in FIG. 3.

Figure 3:
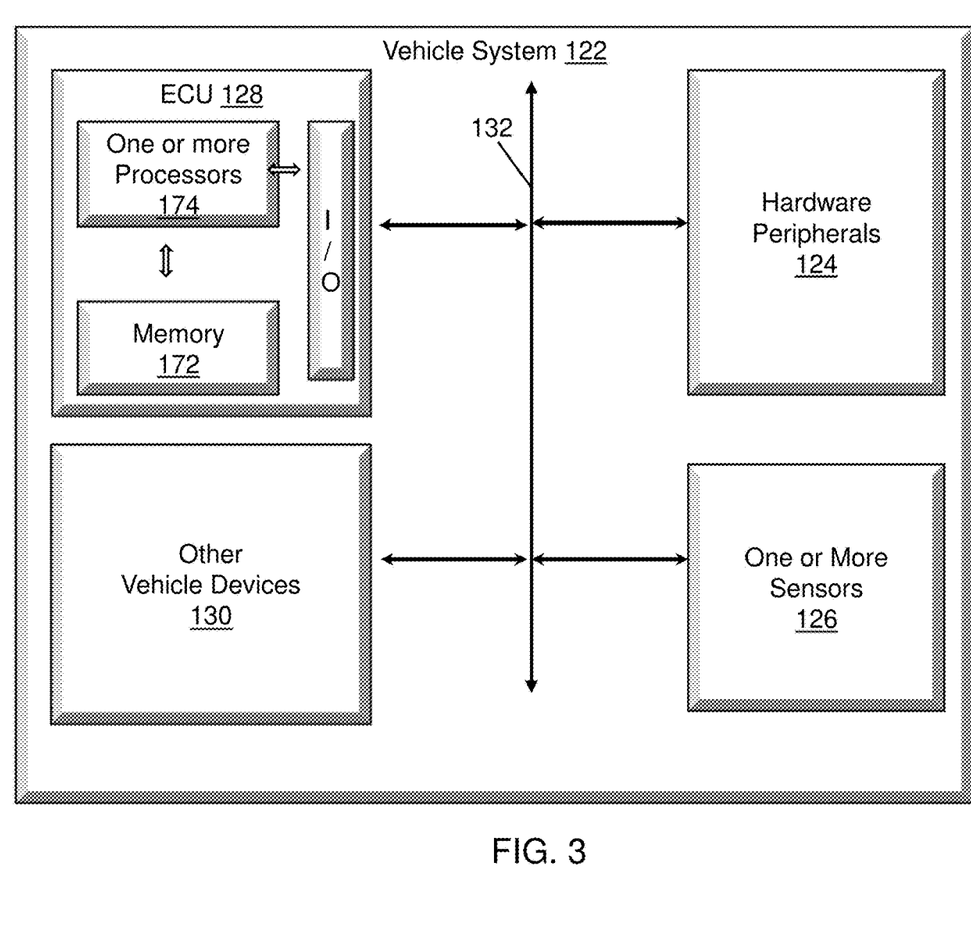
FIG. 3 is a block diagram of a vehicle system according to the present disclosure.

Still referring to FIG. 3, the hardware peripheral devices 124 may include one or more devices connected to the ECU 128 via a vehicle communication bus 132 and in communication with other the ECUs (not shown). The hardware peripheral devices 124 are used for data transfer, data input and displaying processed data. In one form, the hardware peripheral devices 124 may include a timer/interrupt controller 134, a block device 136, a network interface card (NIC) 138, a malfunction indicator lamp 140, a user input device (e.g., a touchscreen display) and/or the like. Each of the hardware peripheral devices 124 is configured to output data indicative of determining whether a feature is active or inactive. For example, the timer/interrupt controller 134 is configured to prioritize and route interruptions from a plurality of devices connected to a specific ECU 128. The block device 136 is configured to provide random access to data organized in fixed-size blocks, which may reside on one or more non-transitory computer readable medium. In one example, the user input device is configured to output a request to an ECU to operate a specific feature. In another example, data from the one or more hardware peripheral devices 124 such as the block device 136 and the NIC 138 is written, using direct memory access (e.g., port I/O, memory-mapped I/O, etc.), to an isolated area of the secure environment 146, such as the attestation module 156 or the trusted storage 154. In another example, the NIC 138 is coupled to the malfunction indicator lamp 140 and is configured to turn ON the malfunction indicator lamp 140. In one form, the NIC 138 may turn ON the malfunction indicator lamp when a diagnostic code is set, or an error related to the function of the feature has been determined. As an example, the ECU 116 may operate the malfunction indicator lamp according to a pre-programmed state machine that facilitates the determination of an erroneous condition, such as the disconnection of a peripheral, loss of network connectivity, tampering of software, etc.

Again, referring to FIG. 2, each of the sensors 126 is configured to detect events and/or changes in an environment of the vehicle 112 and transmits that information to the vehicle communication bus 132. For example, at least one of the sensors 126 may include, but is not limited to, at least one of a vehicle speed sensor, a rain sensor, an internal measurement unit (IMU), light detection and ranging (LIDAR) sensor, radio detection and ranging (RADAR) sensor, vision sensor, a braking sensor, torque demand sensor or any suitable vehicle sensor.

In this example, the ECU 128 is configured to control a specific function or feature of the vehicle 112. For example, a function may include engine control and power steering, power windows and power seats. In this example, a single ECU 128 is shown for exemplary purposes only. The vehicle 112 may include more than one ECU 128. For example, the vehicle 112 may include as many as 100 or more ECUs or as few as three ECUs.

Figure 4:
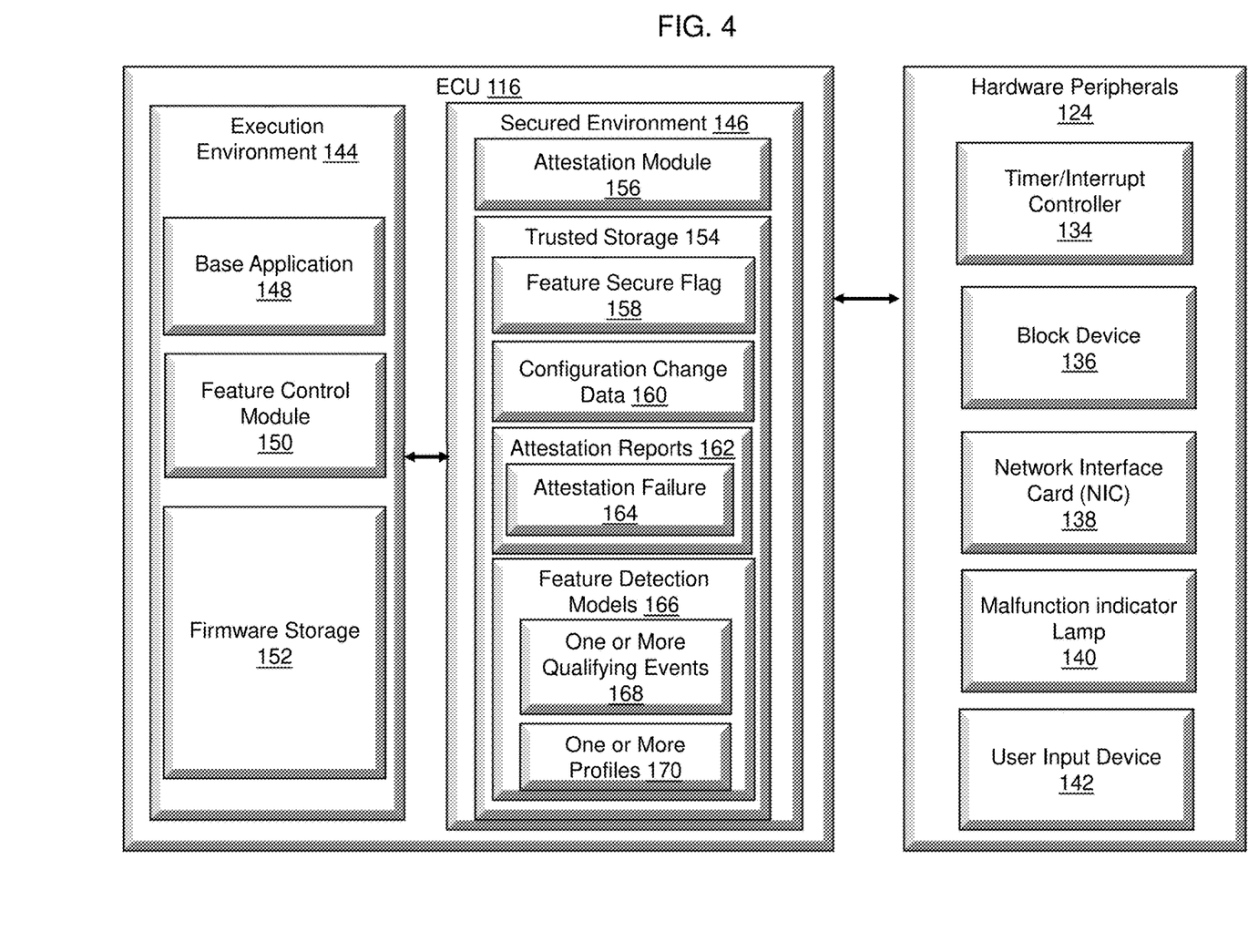
FIG. 4 is a block diagram of an electronic control unit and hardware peripherals of the vehicle in FIG. 2, according to the present disclosure.

Now referring to FIG. 4, the ECU 128 is partitioned to include an execution environment 144 and a secure environment 146.

The execution environment 144 is configured to include a platform for an operating system to execute one or more generators, modules, or mini-controllers related to a specific feature including a base vehicle application 148, a feature control module 150, a feature firmware/software datastore 152. The feature firmware/software datastore 152 includes one or more non-volatile memory, such as EEPROM or random-access memory, to read and store data related to firmware and/or software programs.

The feature control module 150 is configured to execute the operation of a configurable feature associated with the specific ECU 128. More specifically, the feature control module 150 is configured to receive one or more requests to activate the feature associated with the ECU 128. If the feature control module 150 has received a request for download of new or updated firmware/software, the feature control module 150 is configured to download and install the new and/or updated firmware, configuration, software, or a combination thereof into the feature firmware/software datastore 152 to update and/or activate the feature. In one form, the feature control module 150 is configured to generate and/or update configuration change data.

Still referring to FIG. 4, the secure environment 146 is a trusted execution environment (TEE) and includes a trusted storage 160 and an attestation module 156. The secure environment 146 is configured to provide an isolated, safe execution of the trusted storage 154 and the attestation module 156. The trusted storage 154 is configured to allow code execution in the secure environment 146 to store sensitive data including, but not limited to a feature secure flag 158. The feature secure flag 158 includes an unset state and a set state. The feature secure flag 158 remains unset unless a related feature is activated. If the related feature is activated, the feature control module 150 is configured to set the feature secure flag 158 to indicate that the feature is a valid and trusted feature authorized by the OEM, via the OEM server 104. In one example, the feature control module 150 is configured to set the feature secure flag 158 based on validating an authentication of the public key certificate 120 and/or receiving the feature activation profile from the OEM server 104.

Figure 5:
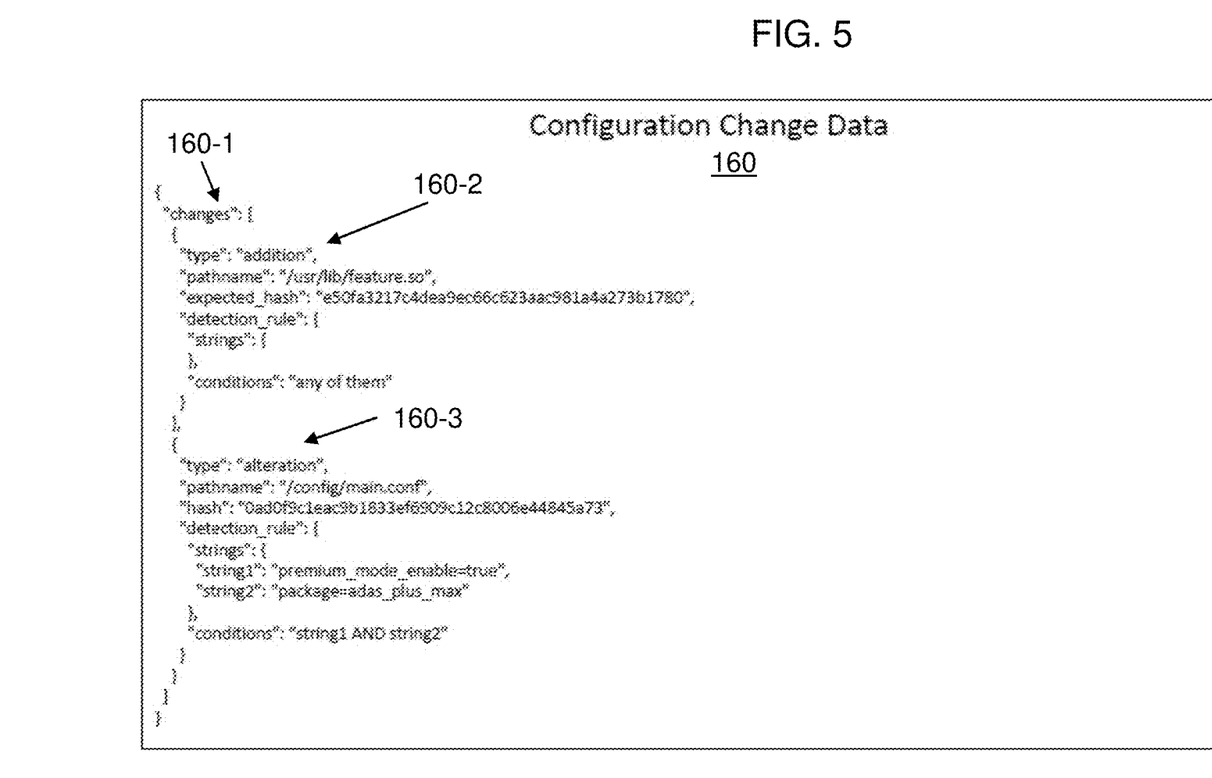
FIG. 5 is an example configuration change data report according to the present disclosure.

Referring to FIGS. 4 and 5, the trusted storage 154 is configured to store configuration change data 160. The configuration change data 160 is a configurable file that includes a recording and/or report of each time firmware and/or software related to the feature of the ECU 128 has been added, deleted or altered in a way that changes an operation of a feature. The configuration change data 160 may include data related to a specific feature including one or more software components, parameters, options settings and/or preferences for operating the feature. In one form, the configuration change data 160 may be written in a script programing language such as JavaScript, python, Lua, bash, and so on. In another form, the configuration change data may be writing in a domain specific language adhering to extensible markup language (XML), JSON, binary JSON (BSON), CSV, flat file, and the like. In one form, the configuration change data 160 may include date and time of an installation, deletion or alteration of firmware, configuration, software, or a combination thereof. In one form, the feature control module 150 is configured to generate and/or update the configuration change data each time the firmware, configuration, software, or a combination thereof related to the selected feature has been added, deleted, or modified. In one form, the feature control module 150 is configured to determine and set the state of the secure flag based on one or more factors. In one form, the one or more factors include at least one of receiving the feature activation profile from the OEM server 104, a validity period associated with an instance of feature activation (e.g., 1 month), and the like.

The trusted storage 154 is configured to store one or more attestation reports 162 of one or more previously conducted attestations. Each attestation report 162 includes a timestamp of the attestation, a result of the attestation including a determination of whether an unauthorized feature was found, and information related to a response activated based on an unauthorized feature being found.

In one form, at least one attestation report 162 includes attestation failure information 164, such as a failure count associated with a respective attestation failure. The failure count indicates a number of occurrences an attestation has failed to complete its process. In one form, the attestation failure information 164 may be recorded within the attestation reports 162. On the other hand, the attestation failure information 164 may be stored in a separate report from the attestation report 162 mentioned above within the trusted storage 154.

In another aspect, the trusted storage 154 is configured to store one or more feature detection models 166. Each feature detection model 166 includes a qualifying event 168. The qualifying event 168 may include a periodic, predetermined time interval based on a configurable build time parameter and/or a dynamic event performed within the vehicle 112. The qualifying event 168 may be based on a runtime factor or a non-maskable system interrupt. For example, the qualifying event 168 may include a request from the OEM server 104 or the user device 102, a received network message related to an active feature, or a run-time parameter.

Each of the feature detection models 166 also includes one or more profiles 170 associated with the qualifying event 168. Each profile 170 includes data associated with the feature in an inactive state and/or the active state. Each profile 170 is configured using trained, and previously recorded, datasets observed based on one or more test cases (see FIG. 8) during an operation of a feature in an active state. The trained and/or previously recorded datasets may include, for example, one or more network messages related to an activated feature, one or more detection rules based on addresses, offsets, data sizes, fields within structs, and/or a presence of data active on the vehicle communication network. For example, the presence of data active on the vehicle communication network 132 may include acceleration profiles of a premium engine feature or temperature profiles of a premium seat heating package. In some forms, the profiles 170 may include one or more build-time parameters along with their corresponding thresholds. The build-time parameters may include configurable vehicle parameters that are configured during a build-process of the vehicle. For example, the build-time parameters may include, but are not limited to, individual streaming segments of data pertaining to the operation of the vehicle system 122, such as CPU or memory load, power usage, diagnostic trouble code counters, program traces, system calls, sensor and actuator values, network flows, telegrams, and datagrams, vehicle communication bus 132, message contents (e.g., values interpreted thereof), corresponding to rules in the configuration change data 160 for related inactive states and/or active states of a respective feature. In one form, the profiles 170 may include a machine learning model configured to find one or more patterns using the trained and recorded datasets acquired during the one or more test cases.

Referring again to FIG. 4, the attestation module 156 is a software application and/or algorithm stored in the trusted storage 154 of a memory 172 and executed by one or more processors 174 of its respective ECU 128. In one form, the attestation module 156 is a trusted application that is configured to perform a security-related function (i.e., attestation). The attestation module 156 is configured to determine when a qualifying event 168 occurs and, in response, detect whether a feature has been activated based on at least one of the one or more feature detection models 166. In one form, the qualifying event 168 includes a request to detect activation of a feature, detection of new or updated configuration change data and/or a predetermined time interval. For example, based on whether a request to detect whether a feature is active is received or an expiration of a predetermined time interval, the attestation module 156 is configured to detect whether the feature has been activated. In one form, the attestation module 156 is configured to check the configuration change data to determine whether firmware, configuration, software, or a combination thereof has been added or modified to activate the feature to determine whether the feature has been activated. If there is any indication that the data of the configuration change data has been added, deleted, and/or altered, the attestation module 156 is configured to determine that the feature has been enabled. For example, FIG. 5 provides an example of configuration change data having changes 160-1 have been made to add a feature (e.g., "addition" 160-2) and alterations have occurred to enable a feature for "premium_mode" (e.g., "alteration" 160-3).

In one form, the attestation module 156 is configured to detect whether the configurable feature has been activated based on the one or more feature detection modules 166. More specifically, the attestation module 156 is configured to detect a presence of a manufacturing feature bypass. Utilizing one of the detection models 166, the attestation module 156 is configured to compare one or more data attributes of the vehicle 112 to a corresponding value, a predetermined threshold, range of values, or discrete character, and determine whether the feature has been activated based on the matching of the one or more attributes associated with the configurable features as read from the execution environment 144, the secure environment 146, or the hardware peripherals 124. The attributes are recognized as being defined in the configuration change data 160, and the matching attributes include one or more values and conditions of the attributes for example being greater or less than to the predetermined threshold, outside or within the predetermined range and/or equal (i.e., in type, length, value) to the matched attribute.

For example, the attestation module 156 is configured to compare data from the configuration change data to data of a profile 170 of a feature detection model 166. Each of the profiles 170 relates to a specific vehicle feature activated and identifies one or more classification of changes that occur when a feature is activated or enabled. Each classification includes one or more previously identified fields and one or more corresponding values. In one form, the attestation module is configured to identify each change recorded within the configuration change data 160 and identify each classification of the change. In one form, the attestation module includes a language model to identify one or more classification types of the recorded changes related to a feature being activated within the configuration change data 160, such as "addition" or "alteration" as shown in FIG. 5. For each change classification of the configuration change data 160, the attestation module 156 is configured to identify one or more fields and their respective values and compare those values to one or more predetermined fields and their related values of the specific profile 170 to determine whether a feature has been activated. In one form, the attestation module is configured to determine that the feature is active if the predetermined fields and their respective values of the profile 170 equal the identified field and their respective values of the configuration change data 160. Likewise, the attestation module is configured to determine that the feature is inactive if the predetermined field and their respective values of the profile 170 are not equal to the identified fields and their respective values of the configuration change data 160.

In another form, the attestation module 156 is configured to monitor data traffic of the hardware peripherals connected through the secure environment 146 to determine whether the feature has been activated based on the feature detection models 166. For example, the attestation module 156 is configured to monitor network related data and determine whether the feature has been activated. In one example, network related data includes, but is not limited to, individual or streaming segments of data pertaining to the operation of the vehicle system 122, such as, CPU or memory load, power usage, diagnostic trouble code counters, program traces, system calls, sensor and actuator values, network flows, telegrams, and datagrams, vehicle communication bus 132 message contents including values interpreted thereof, corresponding to rules in the configuration change data 160. In still another form, the attestation module 156 is configured to intercept data of other devices including from any one of the sensors 126 (see FIG. 3) and/or other ECUs 128 connected to the vehicle communication bus 132 to determine whether a feature is activated. In one form, the attestation module 156 is configured to gather event information through hooks injected into the vehicle communication bus during a build-time process through reports received from a trustworthy security monitor, supervisor, or hypervisor. In another example, the attestation module 156 is configured to monitor system-related events such as, but not limited to, loading of application executables related to the feature, loading of configuration files related to the feature, sending/receiving network packages/messages, reading/writing files related to a specific feature and/or the like. In another aspect, the attestation module 156 is further configured to monitor a function-related event such as a diagnostic trouble code being flagged, a payment being processed for electronic toll collection (ETC), electronic vehicle (EV) charging, share-ride, etc., software function hook, callback, breakpoint, or execution event, recognition of particular sensor or communication bus message values, a feature being selected using a user input device (not shown), and/or a request by a voice assistant of the user device to determine whether the feature has been activated. The initiation of any one or more of the above-mentioned events or metadata associated with the events such as logs, program flows, data flows and the like may indicate that the feature has been activated.

In this form, the attestation module 156 is configured to compare monitored data to one of the profiles 170 to determine if a feature is activated. The profile 170 includes at least one of an exact value, a threshold range, a minimum threshold value, or a maximum threshold value. In one example, if the monitored data exceeds a maximum threshold or is outside of the threshold range for the inactive state, the attestation module 156 is configured to determine that the feature is active. If the monitored data does not exceed the maximum threshold or is within the threshold range, the attestation module 156 is configured to determine that the feature is inactive. Likewise, if the monitored data is equal to the exact value of the profile 170, the attestation module 156 is configured to determine that the feature is active. On the other hand, if the monitored data is not equal to the exact value of the profile 170, the attestation module 156 is configured to determine that the feature is inactive.

Once the feature has been detected, the attestation module 156 is configured to determine whether the feature is authorized or unauthorized by the OEM server 104. In one aspect, the attestation module 156 is configured to check the status of the feature secure flag 158. If the feature secure flag 158 has been set, the attestation module 156 is configured to determine that the feature is activated and authorized. On the other hand, if the feature secure flag 158 is not set, the attestation module 156 is configured to determine that the feature is active, but unauthorized.

Based on the determination of the feature being active and unauthorized, the attestation module 156 is configured to activate a response mechanism. In one form, the attestation module 156 is configured to restore the active and unauthorized feature along with any related vehicle devices 117 and/or software components and parameters to a state prior to the activation of the feature. Another form of the attestation module 156 is configured to display, to the user 110, a notification such as a warning/error message if the feature is active and unauthorized. In addition to displaying the notification to the user 110, the attestation module 156 configured to transmit the warning/error message to the OEM server 104 to report that the feature has been enabled and is unauthorized. In one form, the attestation module 156 is configured to generate a report that includes the warning/error message.

In one example, the attestation module 156 is configured to activate a malfunction/tampering indicator lamp 140 and/or diagnostic trouble code (DTC) in the vehicle 112 when the feature is determined as active and unauthorized. On the other hand, the malfunction/tampering indicator lamp 140 and/or DTC remains in an inactive state when the feature is determined as inactive, or active and authorized. In another form, the attestation module 154 is configured to limit one or more vehicle functions related and/or non-related to the activated feature if the feature is determined to be active and unauthorized.

In one form, the attestation module 156 is configured to generate a report detailing a status of the feature (e.g., active, inactive, authorized, or unauthorized) and securely logging the status of the feature along with optionally noting any responsive mechanism executed by the attestation module 156. In some forms, the report is cryptographically signed and embedded in a public key certificate or sanitized/anonymized to preserve user privacy. For example, the public key certificate 120 may sign an attestation key in order to prove the key is valid without revealing the association between the attestation key and the identity of the attestation module 156. In one example, the OEM server 104 is configured to transmit a request for the report generated by the attestation module 156. In some forms, the request includes a nonce (random) value issued by the OEM server 104 that is desired to prove an integrity of a response from the attestation module 156 to the request. In this example, the attestation module 156 is configured to retrieve a most recent report, apply a fresh certificate to the most recent report using the nonce and transmits the most recent report to the OEM server 104.

In another aspect, if the attestation module 156 fails to initiate or complete a process of determining whether the feature was active for any reason, the attestation module 142 is configured to securely log and update the attestation failure information 164 along with any forensically valuable information such as timestamp, memory contents, connection logs, user history and the like. In one form, the attestation module 156 is configured to increase an attestation failure count for the attestation failure information when the attestation module 156 fails to complete a step of determining whether the feature was enabled and/or authorized. In some forms, the attestation module 156 is configured to limit one or more vehicle functions associated with a policy corresponding to the activated feature(s) if the attestation process fails to initiate or complete for any reason.

Figure 6:
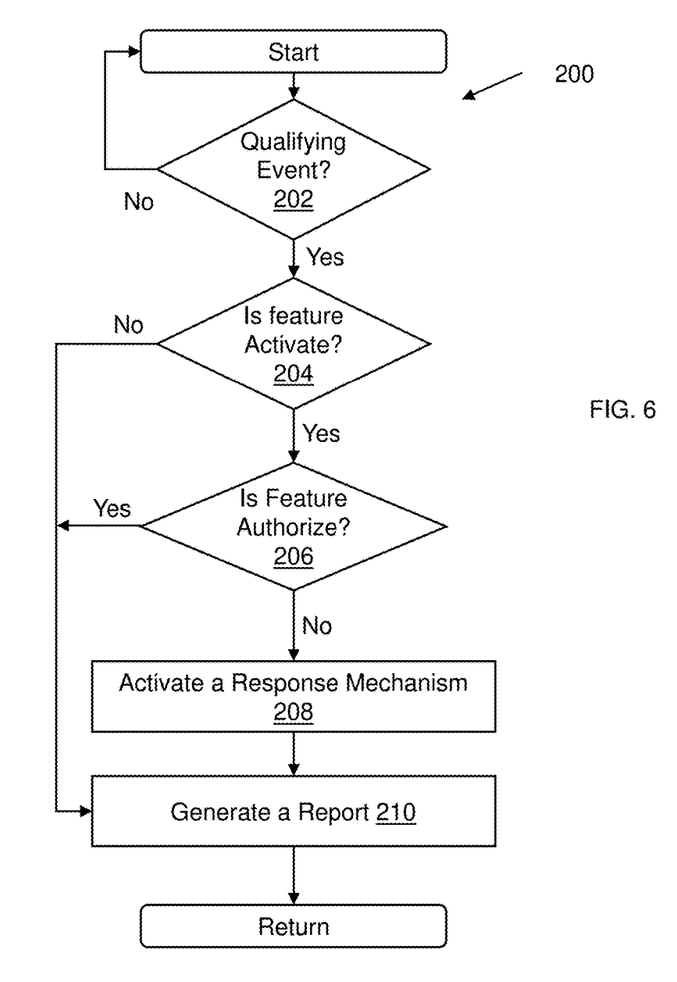
FIG. 6 is a flow chart of a method of remote attestation according to the present disclosure.

Referring to FIG. 6, a method 200 utilizing the system 100 will now be discussed. At 202, the method 200 includes detecting, using an attestation module, whether a qualifying event has occurred to conduct an attestation for a specific feature. In one form, the attestation includes detecting whether the specific feature is active and authorized.

When the qualifying event has occurred, the method proceeds to 204. At 204, the method includes detecting whether a specific feature is activated based on one or more profiles 170. In one form, the method includes detecting the presence of data active on the vehicle communication network 132 and comparing that data to an acceleration profile of a premium engine feature or a heated seats profile of a premium seating package. In some forms, the profiles 170 may include one or more build-time parameters along with their corresponding thresholds. The build-time parameters may include configurable vehicle parameters that are configured during a build-process of the vehicle. For example, the build-time parameters may include CPU or memory load, power usage, diagnostic trouble code counter for related inactive states and/or active states of a respective feature. In one form, the profiles 170 may include a machine learning model configured to find one or more patterns using the trained and recorded datasets acquired during the one or more test cases derived during a development process.

At 206, the method includes determining whether an activated feature has been authorized based on a stored security flag stored in a trusted storage. If the feature is activated and authorized, the method proceeds to 210. At 210, the method logs a report of attestation results including a determination of whether the feature was active and authorized and then proceeds to Return.

On the other hand, if the feature is activated and unauthorized, the method proceeds to 208. At 208, the method includes activating a response mechanism. In one form, the response includes restoring the vehicle to its factory preset conditions prior to the feature being activated. The method then proceeds to 210.

Figure 7:
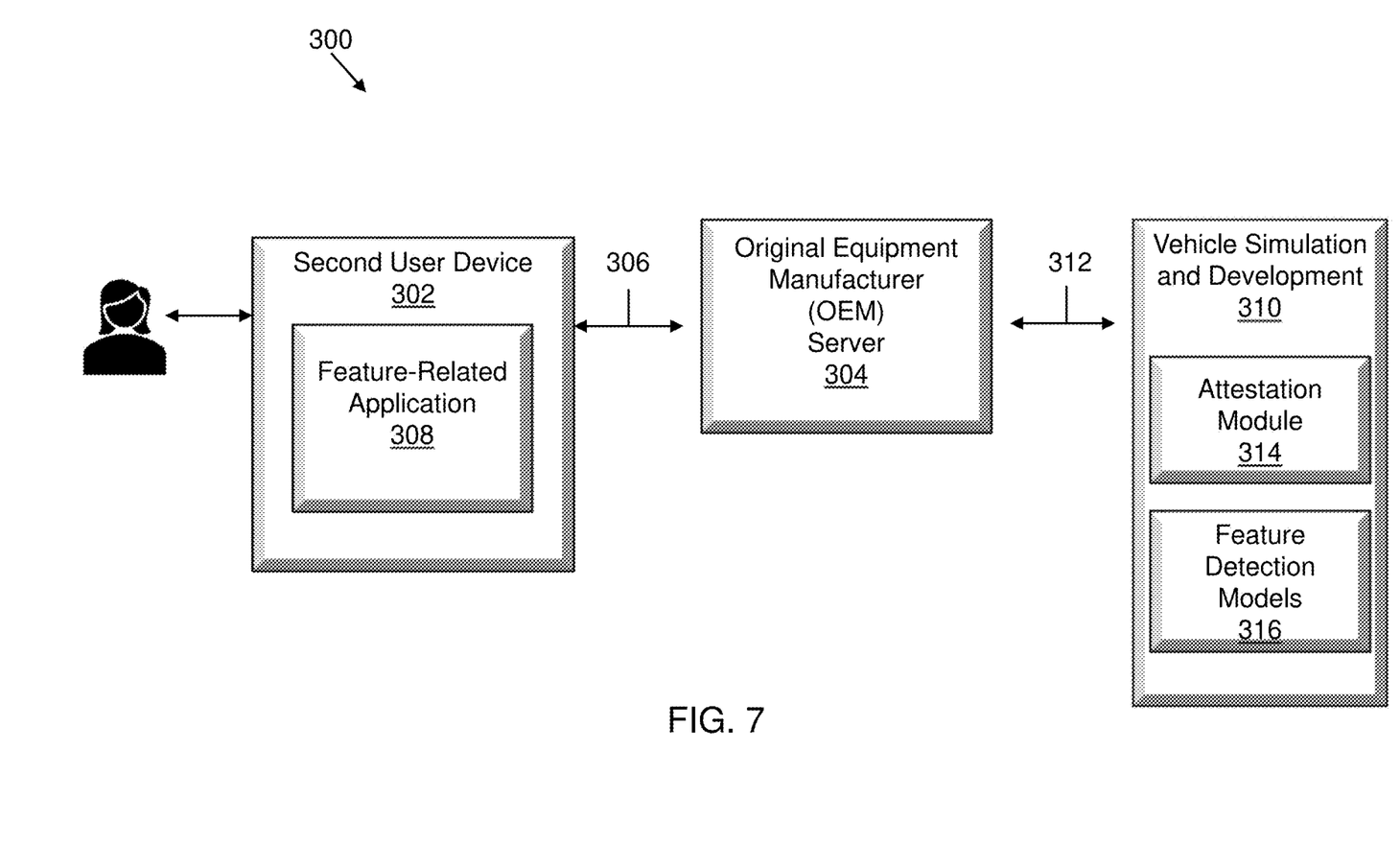
FIG. 7 is an illustration having a vehicle simulation and development system provided according to the present disclosure.

Now turning to FIG. 7, an overview of an example system 300 for generating a trusted application (e.g., an attestation module and/or feature detection models) is provided. The system 300 includes a second user device 302 in communication with an OEM server 304, via a third communication link 306. A user, such as a developer, programmer, system developer, or the like, may utilize a feature-related application 308 of the second user device 302 to transmit a request for activation of a vehicle feature, via the third communication link 306, to an OEM server 304. In one form, the second user device 302, the feature-related server 304, and the third communication link 306 may include similar features and functions as the first user device 102, the feature-related application 108, the OEM server 104, and the first communication link 106, respectively and thus for the sake of brevity will not be discussed herein.

Upon receiving the request for activation of a vehicle feature, the OEM server is configured to transmit the feature activation profile, via a fourth communication link 312, to a vehicle simulation and development system 310. The fourth communication link 312 is similar in features and functions as the first communication link 106, and thus will not be discussed for the sake of brevity.

The vehicle simulation and development system 310 is configured to simulate the activation or deactivation of a feature in the vehicle 112. In one form, the vehicle simulation and development system include an attestation module 314 and one or more feature detection module 316 to determine whether the vehicle feature is activated. The attestation module 314 and the one or more feature detection models 316 are similar in features and functions as the attestation module 156 and the feature detection models 166, and for the sake of brevity shall not be discussed here.

Figure 8:
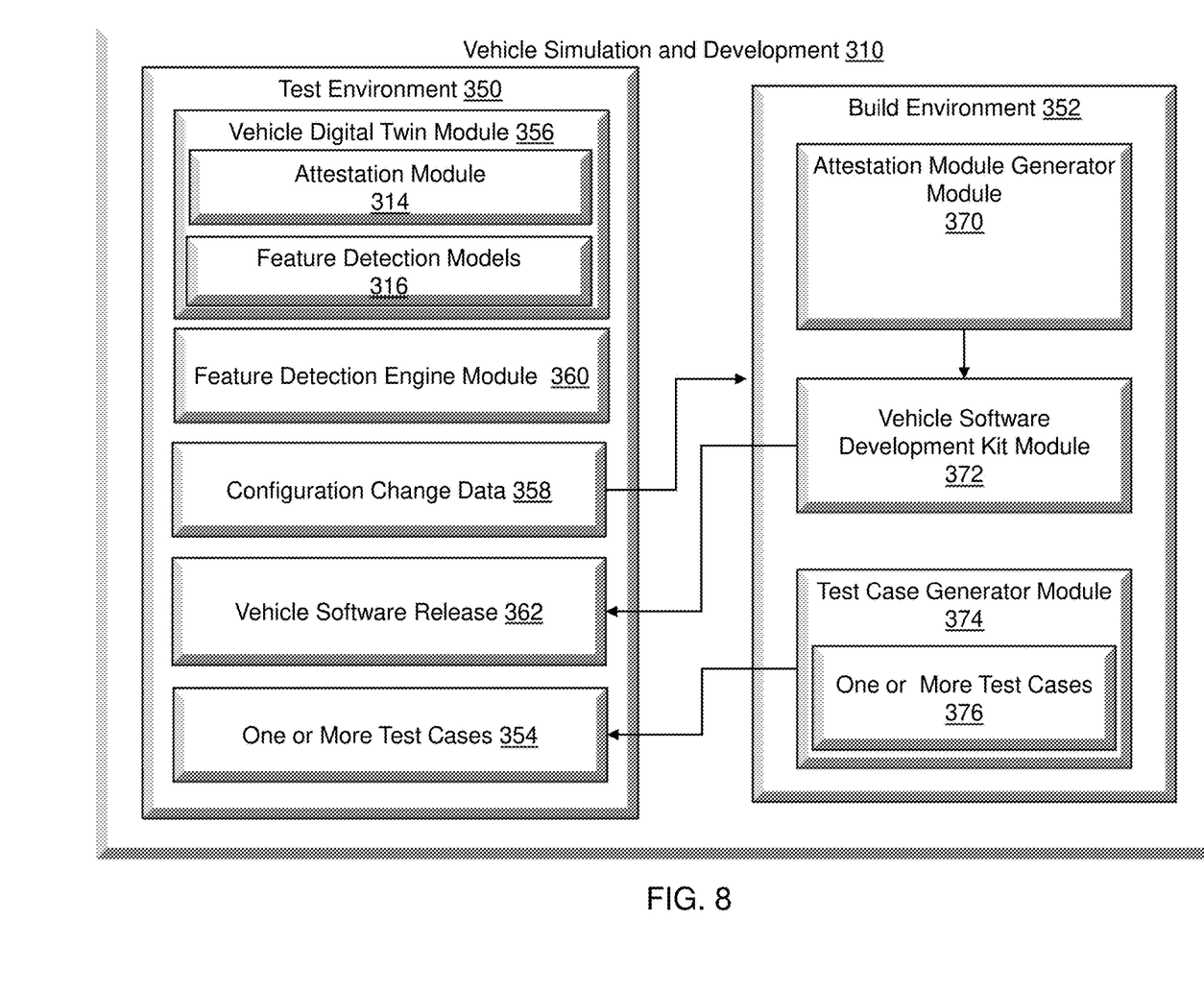
FIG. 8 is a block diagram of the vehicle simulation according to the present disclosure.

Referring now to FIG. 8, as stated above, the vehicle simulation and development system 310 is configured to simulate a digital representation of the physical vehicle 112 by mimicking or emulating the execution of one or more features and functions of the physical vehicle 112. In another form, the vehicle simulation and development system 310 is configured to generate an attestation module based on the digital representation of the vehicle 112. The vehicle simulation and development system 310 includes a test environment 350 in communication with a build environment 352. In one form, the test environment 350 is a server configured to allow a user to run one or more test cases 354 to verify and validate a vehicle system 122 prior to manufacturing a vehicle including, but not limited, to testing activation and/or deactivation of a vehicle feature.

The test environment includes one or more processing devices or processors and memory or memory devices. Each processor includes any type of device capable of processing electronic instructions including microprocessors, microcontrollers, host processors, controllers, vehicle communication processors, field programmable gate arrays (FPGAs), complex programmable logic device (CPLDs), and application specific integrated circuits (ASICs). The processor executes various types of digitally-stored instructions, such as software or firmware programs stored in memory, which enable a vehicle module (not shown) to provide various services, functions and/or features.

The memory may include any suitable computer usable or readable medium, which includes one or more storage devices or articles. Exemplary computer usable storage devices induce conventional computer system RAM (random access memory), ROM (read only memory) EPROM (erasable, programmable ROM), EEPROM (electrically erasable, programmable ROM) and magnetic or optical disks or tapes. According to one or more forms, the memory may be categorized or divided into identifiable segments carrying or storing diagnostic data or diagnostic services— each segment having or being associated with a cell or address. At least some of the addresses may store sensitive or confidential information relating to a vehicle operation.

In one form, the test environment 350 includes the test cases 354, a vehicle digital twin 356, configuration change data 358, a feature detection engine 358, and vehicle software release software kit 362. In one form, the one or more test cases 354 include one or more actions or instructions executed to verify a particular or specific feature or function of a vehicle system. Each of the test cases 354 includes steps, data, preconditions and postconditions developed for a specific test scenario to verify a specific requirement. In one form, each test case 354 is configured to allow a user to compare expected results with actual results to determine whether an application is functioning as per requirements determined by the user. For example, a test case 354 may include enabling a feature related to the environment of a vehicle, such as cock pit lighting for a vehicle driver, in order to determine the impact an enabled lighting feature would have on a vehicle. The test cases 354 provide a user (e.g., a developer or engineer) a way to mimic an operation of a vehicle that allows a user to determine an impact on an activated feature prior to implementing a feature into a manufactured or actual vehicle 112. In one form, the test cases 354 are configured to determine whether one or more software programming applications and/or routines, as provided in the feature activation profile 114 are operating correctly and properly to activate the requested vehicle feature. In one form, the software programming applications include computer program instruction code, calibration values, configuration values, credentials, system settings and the like. In one form, the one or more tests cases 354 are configured to determine whether a process of activating the feature is operating properly. In one form, the test cases 354 are configured to generate a positive report when the related software and/or applications have been executed properly. On the other hand, the test cases 354 are configured to generate a negative report when the related software and/or applications have trouble operating and/or executing the activation of the vehicle feature or an error is found during the activation of the feature. The test cases 354 are configured to send feedback information to the build environment 352 if a negative report is generated. In some forms, the test cases 354 is configured to send feedback information to the build environment 352 if one or more applications and/or software routines are not correctly operating and/or executing the activation of vehicle feature or an error is occurring during the activation of the feature without generating a negative report. In one form, the feedback information includes a request to generate another trusted application (i.e., attestation module and feature detection models) based on the configuration change data 358.

The vehicle digital twin 356 is a digital representation (e.g., software and hardware elements) or vehicle simulator of a physical vehicle 112 to verify and validate vehicle testing including testing the activation and/or deactivation of a vehicle feature. The vehicle digital twin 356 is configured to mimic the vehicle 112, using a selected test case 354, when the vehicle feature profile 114 is received from the OEM server 304. In one form, the vehicle digital twin 356 is configured to receive the vehicle feature profile 114 to activate a selected vehicle feature. The vehicle digital twin 356 is configured to install and/or update the one or more vehicle features related software to enable and/or disable the selected feature based on the vehicle feature profile 114.

Still referring to FIG. 8, the feature detection engine 360 shall now be discussed. In one form, the feature detection engine 360 is in communication with the vehicle digital twin 356 and is configured to monitor one or more system changes including data network transmission, vehicle speed, sensor data transmitted on a vehicle network being simulated by the vehicle digital twin, or the like. In one form, the feature detection engine 360 is configured to determine whether a selected vehicle feature has been activated or deactivated based on one or more system changes. More specifically, the feature detection engine 360 is configured to automatically monitor and record any configuration change data changes based on activating or deactivating a selected vehicle feature. The feature detection engine is configured to report and store any software and/or module changes within the test environment 350 to the configuration change data 358. In one form, the feature detection engine 360 is configured to classify one or more system changes that occurred as a result of activating and/or deactivating the selected feature. For example, the feature detection engine 360 is configured to determine whether a change in the vehicle digital twin module system include an addition, a deletion, and/or a modification to one or more software programming applications. In one form, the software programming applications includes computer program instruction code, calibration values, configuration values, system settings and the like. As provided herein, the software programming applications include, but are not limited to, vehicle feature related software and/or the attestation module 306. In one example, the feature detection engine 360 is configured to determine whether a feature has been activated based on the monitored data of the vehicle digital twin 356.

It should be noted that the configuration change data 358 can be generated by any one of vehicle digital twin module 356, attestation module 314, the feature detection engine module 360, and/or the vehicle software release management software 362 based any changes to software programming applications and/or programs within the test environment 350. In one form, the configuration change data 358 is further configured and includes similar features and functions as the configuration change data 160 discussed above and will not be discussed for the sake of brevity.

In one form, the vehicle software release 362 is a software package received from the build environment and installed within the vehicle digital twin module 356. The software package includes one or more software programming applications and/or software modules, including any vehicle software updates, the attestation module, and the vehicle feature detection module 166. The vehicle release software shall be further discussed below.

Still referring to FIG. 8, the build environment 352 is configured to generate one or more trusted applications and one or more test cases. In one form, the build environment 352 is a server (e.g., hardware and software) configured to allow a user to develop and create a trusted application to be utilized within the test environment 350 and the vehicle 112.

The build environment 352 includes one or more processing devices or processors and memory or memory devices. Each processor includes any type of device capable of processing electronic instructions including microprocessors, microcontrollers, host processors, controllers, vehicle communication processors, field programmable gate arrays (FPGAs), complex programmable logic device (CPLDs), and application specific integrated circuits (ASICs). The processor executes various types of digitally-stored instructions, such as software or firmware programs stored in memory, which enable a vehicle module (not shown) to provide various services, functions and/or features.

The memory may include any suitable computer usable or readable medium, which includes one or more storage devices or articles. Exemplary computer usable storage devices include conventional computer system RAM (random access memory), ROM (read only memory) EPROM (erasable, programmable ROM), EEPROM (electrically erasable, programmable ROM) and magnetic or optical disks or tapes. According to one or more forms, the memory may be categorized or divided into identifiable segments carrying or storing diagnostic data or diagnostic services— each segment having or being associated with a cell or address. At least some of the addresses may store sensitive or confidential information relating to a vehicle's operation.

The build environment 352 includes an attestation module generator module 370, a vehicle software development kit (SDK) module 372 and a test case generator module 374.

The attestation module generator module 370 is a software building tool and a trusted application generator configured to generate one or more trusted applications for installation in the test environment 350. In one form, at least one of the trusted applications includes the attestation module 314 and the feature detection models 316. The attestation module generator module 370 is configured to receive the configuration change data 358 from the test environment 350. Upon receipt of the configuration change data 358, the attestation module generator module 370 is configured to read the configuration change data 358. In one form, the attestation module generator module 370 is configured to generate the attestation model and the feature detection models 316 using one or more code templates of common source code patterns to detect one or more fields of the configuration change data 358 and compile the software code to program the attestation module and the feature detection models 316. In some forms, the attestation module generator module 370 is configured to use a language model, a machine learning model, in lieu of the code templates, to detect one or more fields (e.g., classified categories and their respective values) described in the configuration change data and predict the software code to program the attestation module and the feature detection models 316. The language model includes one of a transformer, artificial neural network, large language model (LLM), Generative Pre-trained Transformer (GPT), and the like.

In one form, the attestation module generator module 370 is configured to generate the attestation module 314 and the vehicle detection models 166 based on the identified fields and their respective values associated with the identified fields. In one form, the attestation module generator module 370 includes one or more code templates of common source code patterns to detect one or more fields of the configuration change data 358 and generate a trusted software application and detection models to determine whether a vehicle feature has been activated based on the configuration change data 358. In another example, the attestation module generator module 370 includes a language model 376, in lieu of the code templates, using machine learning and configured to detect the one or more fields and their related values within the configuration change data 358. In one form, the language model includes one of a transformer, artificial neural network, large language model (LLM), Generative Pre-trained Transformer (GPT), and the like. In one form, the attestation module generator module 370 is configured to generate the attestation module 314 (i.e., a trusted application) and/or the feature detection models 316 based on the configuration change data 358 received from and generated by the test environment 350.

Once the attestation module 314 and the feature detection models 316 have been generated, the vehicle software development kit (SDK) is configured to prepare the vehicle software release 362, which includes the attestation module 314 and the feature detection models 316. The vehicle SDK is configured to include information and data on a hardware platform of the test environment 150 and/or the vehicle 112. In one form, the hardware platform includes at least one of a device tree, filesystem, type of trusted execution environment and the like. Once the vehicle software release 362 has been compiled, the vehicle SDK is configured to install the vehicle software release 362 within the vehicle digital twin module 356.

In one form, the test case generator module 374 includes a software development tool that is configured to generate one or more test cases 354 based on the configuration change data 358. In one form, the one or more test cases 354 includes one or more attestation test cases. The attestation test cases are configured to verify that the attestation module 314 and the vehicle feature detection models 316 are working properly. In one form, the test cases 354 are configured to determine that the attestation module correctly detects all of the configuration change data changes associated with activating or deactivating the vehicle feature. In one form, the test case generator module 374 is configured to generate the test cases 354 based on one or more identified fields and their respective values associated with the identified fields. In one form, the test case generator module 374 includes one or more code templates of common source code patterns to detect one or more fields of the configuration change data 358 and generate the test cases 354 based on the one or more fields. In another example, the test case generator module 374 includes a language model 376, in lieu of the code templates, using machine learning and configured to detect the one or more field and their related values within the configuration change data 358 and predict the software code to form the test cases 376. In one form, the language model includes one of a transformer, artificial neutral network, large language model (LLM), Generative Pre-trained Transformer (GPT), and the like. In one form, the test case generator module is configured to transmit the test cases 354 to the test environment 350.

In this example, the computing device includes a feature-related application that is configured to communicate with an original equipment manufacturer (OEM) server to activate. In this example, the user device 14 wirelessly communicates with the OEM server 16 to request the specific feature for the vehicle 12.

In one form, the OEM server 16 may require a predetermined condition to be met prior to activating and/or updating the feature of the vehicle. In one form, the OEM server requires an authorization or payment and, in response to the authorization and/or payment being completed, wirelessly downloads software/firmware, configuration, software, or a combination thereof to the vehicle 12 to activate the specific feature.

Figure 9:
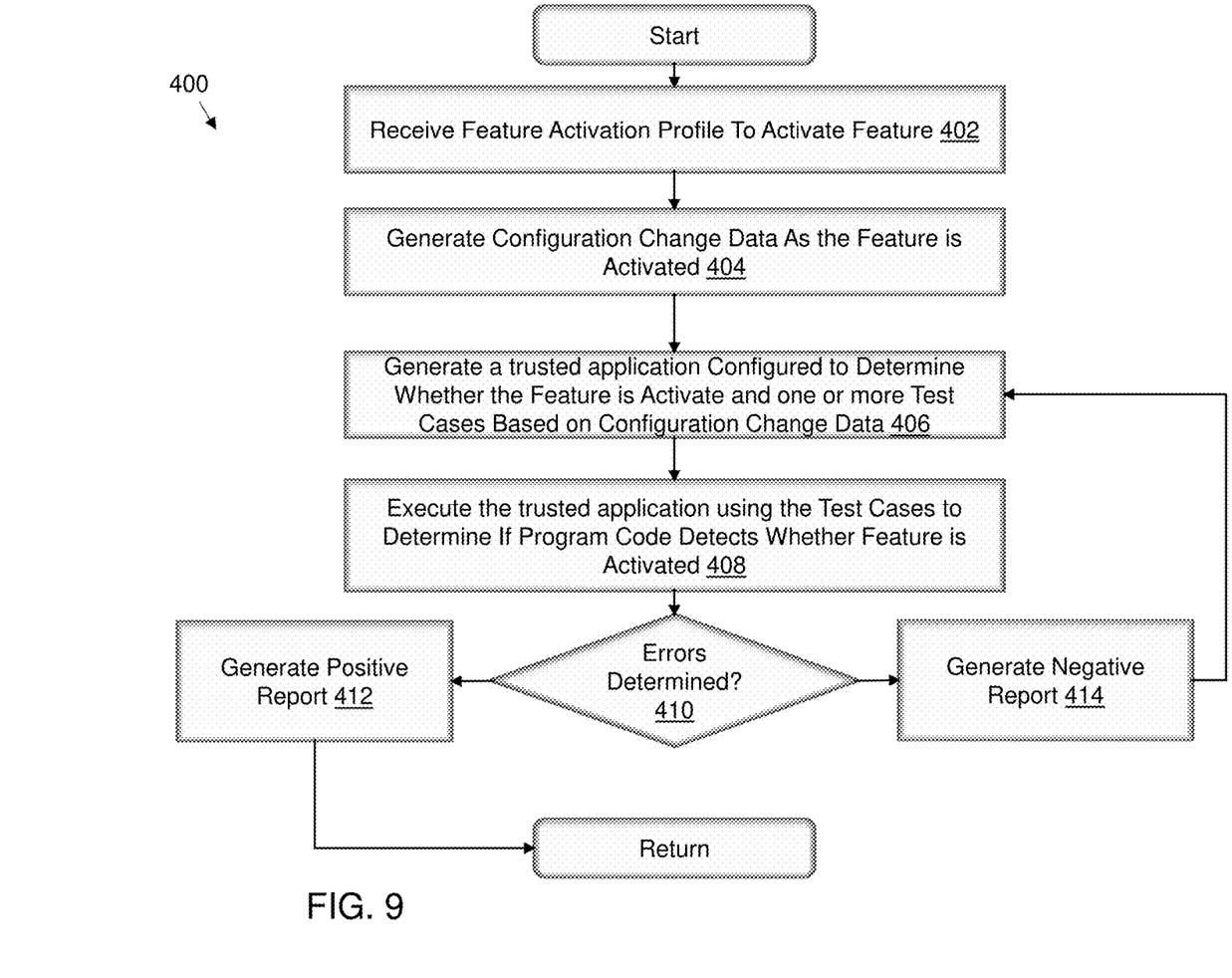
FIG. 9 is a flow chart of a method of generating a trusted application according to the present disclosure.

Referring to FIG. 9, a method 400 implementing a vehicle simulation and development system is provided. The method includes receiving a feature activation profile from an OEM server at 402. In one form, the feature activation profile includes one or more software components and/or parameters for updating/changing an inactive feature into an active feature of a vehicle.

At 404, the vehicle simulation and development system 310 generates configuration change data as software components and/or parameters are installed, deleted and/or modified to activate the requested feature. Based on the configuration change data, the vehicle simulation and development system 310 generates a trusted application (i.e., the attestation module 314 and feature detection models 316) and one or more test cases at 408. The trusted application is configured to determine whether a feature is activated, and the test cases are configured to determine whether the trusted application operates as expected and determine whether any errors occurred during the execution of the trusted application. Once the trusted application and test cases are generated, the vehicle simulation and development system 310 executes the trusted application using the test cases to determine whether a feature is activated at 408. At 410, the method determines whether any errors occurred during the execution of the trusted application at 410. If no errors occurred, the method proceeds to 412. If one or more errors were detected during the execution of the trusted application, the method proceeds to 414.

At 412, the method generates a positive report indicating that the trusted application was successful at determining whether the feature was activated.

At 414, the method generates a negative report indicating that the trusted application was failed at determining whether the feature was activated, and the method returns to 406 in order to generate new trusted application to detect whether a feature has been activated.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

As provided herein, in some forms, vehicle functionality relates to functions provided to a driver of the vehicle 112, but may also include software functions and associated tasks performed by the ECU 116, singularity and collectively, in the vehicle system 122 in a cooperative, distributed, and/or parallel manner.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A.

Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both codes, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code Rust, C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for attestation of a vehicle feature associated with a vehicle control unit, the method comprising:
    detecting, using a trusted application stored in a trusted execution environment of a vehicle, whether a configurable feature has been activated based on one or more detection models, wherein the configurable feature includes a specific vehicle functionality and includes an active state or an inactive state such that the vehicle operates the specific vehicle functionality when the configurable feature is activated in the active state, and wherein each of the one or more detection models includes a qualifying event indicating a periodic predetermined time interval;
    periodically detecting during runtime, using each of the one or more detection models, whether the configurable feature is activated based on the qualifying event and the periodic predetermined time interval;
    generating a report of attestation results indicating that the configurable feature is one of: activated and unauthorized; activated and authorized; un-activated and authorized; and un-activated and unauthorized;
    determining whether an activated feature is unauthorized, wherein the activated feature is the configurable feature that has been detected as being activated; and
    activating a response mechanism and restoring the configurable feature of the vehicle to an inactive state in response to the activated feature being unauthorized.

2. The method of claim 1, wherein the detecting whether the configurable feature has been activated further comprises determining whether configuration change data has been modified to activate the configurable feature by at least one of adding, deleting, modifying or a combination thereof software, firmware, or a combination thereof related to the configurable feature.

3. The method of claim 1, wherein the determining whether the configurable feature has been activated further comprises intercepting data associated with one or more hardware peripherals electrically coupled to the trusted execution environment to determine whether the configurable feature has been activated.

4. The method of claim 1, wherein the determining whether the activated feature is authorized includes determining whether a secure flag has been set to indicate that the configurable feature is authorized by an original equipment manufacturer.

5. The method of claim 1, further comprising:
downloading firmware, configuration, software, or a combination thereof to an electronic control unit of a vehicle to active the configurable feature of the vehicle;
generating configuration change data based on the downloaded firmware, configuration, software, or a combination thereof; and
setting a secure flag to indicate that the firmware, configuration, software, or a combination thereof is authorized by an original equipment manufacturer.

6. The method of claim 1, wherein:
the one or more detection models include a qualifying event configured to determine when to determine whether the configurable feature has been activated; and
the qualifying event is configured to trigger based on one of a predetermined time interval based on a configurable build time parameter, a dynamic event performed within the vehicle, a request initiated by an original equipment manufacturer (OEM) server or a combination thereof.

7. The method of claim 1, wherein the detecting whether the configurable feature has been activated based on the one or more detection models further comprises detecting a presence of a manufacturing feature bypass application or feature.

8. A method for generating a trusted application to determine whether a feature has been activated in a vehicle, the method comprising:
receiving a vehicle feature profile to active a vehicle feature;
generating configuration change data as the vehicle feature is being activated, wherein the configuration change data is a report that includes one or more fields and field values associated with the one or more fields, and wherein each of the one or more fields and the field values indicates at least one of one or more additions of software programming applications, deletions of software programming applications, one or more modifications of software programming applications or a combination thereof; and
generating a trusted application and one or more test cases based on the configuration change data, wherein the trusted application is configured to determine whether the feature has been activated based on one or more detection models, wherein the one or more test cases are configured to determine whether the trusted application operates to detect whether the feature is detected, and wherein each of the one or more detection models includes a qualifying event indicating a periodic predetermined time interval;
executing the trusted application using the one or more test cases to detect whether a configurable feature has been activated based on the one or more detection models;
periodically detecting during runtime, using each of the one or more detection models, whether the configurable feature is activated based on the qualifying event and the periodic predetermined time interval;
generating a report of attestation results indicating that the configurable feature is one of: activated and unauthorized; activated and authorized; un-activated and authorized; and un-activated and unauthorized;
determining whether an activated feature is unauthorized, wherein the activated feature is the configurable feature that has been detected as being activated; and
activating a response mechanism and restoring the configurable feature of the vehicle to an inactive state in response to the activated feature being unauthorized.

9. The method of claim 8 further comprises generating a negative report and another trusted application when the one or more errors have occurred.

10. The method of claim 8 further comprising generating a positive report when the one or more errors have not occurred.

11. The method of claim 8 further comprising:
receiving a download of a feature activation profile to activate a vehicle feature in a vehicle;
activating the vehicle feature in the vehicle;
generating a second configuration change data when the vehicle feature is activated; and
determining whether the vehicle feature has been activated using the trusted application.

12. The method of claim 8, wherein the trusted application is generated comprises:
generating the trusted application using one or more code templates of common source code patterns to detect one or more fields of the configuration change data.

13. The method of claim 8, wherein the one or more test cases are generated comprises:
generating the trusted application using one or more code templates of common source code patterns to detect one or more fields of the configuration change data.

14. The method of claim 8, wherein the trusted application generated comprises:
generating the trusted application using a language model to:
detect one or more fields in the configuration change data; and
predict software code for the trusted application based on the one or more fields.

15. The method of claim 8, wherein the one or more test cases generated comprises:
generating the one or more test cases using a language model to:
detect one or more fields in the configuration change data; and
predict software code for the one or more test cases based on the one or more fields.

* * * * *